US005616384A

United States Patent [19]

Goettmann et al.

[11] Patent Number: 5,616,384

[45] Date of Patent: Apr. 1, 1997

[54] RECYCLABLE POLYMERIC LABEL PAPER

[75] Inventors: James A. Goettmann, North East, Pa.; Stephen H. Monroe, Germantown, Tenn.; Peter J. Angelini, Central Valley, N.Y.; John R. Boylan, Newtown, Pa.

[73] Assignee: International Paper Company, Purchase, N.Y.

[21] Appl. No.: 161,358

[22] Filed: Dec. 2, 1993

Related U.S. Application Data

[63] Continuation of Ser. No. 823,525, Jan. 21, 1992, abandoned, which is a continuation-in-part of Ser. No. 489,427, Mar. 5, 1990, Pat. No. 5,133,835.

[51] Int. Cl.$^{6}$ .......... B29D 23/00

[52] U.S. Cl. .......... 428/36.1; 428/35.7; 428/36.4; 428/36.9; 428/36.91; 204/509; 215/400; 162/135; 162/157.5

[58] Field of Search .......... 428/35.7, 36.1, 428/36.4, 284, 286, 287, 290, 343, 347, 373, 374, 394, 395, 36.9, 36.91, 36.92; 204/509; 215/1 C; 168/135, 157.5

[56] References Cited

U.S. PATENT DOCUMENTS

| | | | |
|---|---|---|---|
| 2,684,775 | 7/1954 | Von Hofe | 216/21 |
| 4,084,035 | 4/1978 | Arpin et al. | 428/352 |
| 4,092,457 | 5/1978 | Fujita et al. | 428/341 |
| 4,333,968 | 6/1982 | Nahmais | 427/173 |
| 4,626,456 | 12/1986 | Farrell et al. | 428/35 |
| 4,635,002 | 12/1982 | Takahashi et al. | 428/483 |
| 4,656,094 | 4/1987 | Kojima et al. | 428/412 |
| 4,657,804 | 4/1987 | Mays et al. | 428/212 |
| 4,668,566 | 5/1987 | Braun | 428/286 |
| 4,713,289 | 12/1987 | Shiffler | 428/361 |
| 4,837,075 | 6/1989 | Dudley | 428/220 |
| 4,904,324 | 2/1990 | Heider | 156/214 |
| 4,941,947 | 7/1990 | Guckert et al. | 162/103 |
| 4,986,866 | 1/1991 | Ohba et al. | 156/220 |
| 5,000,824 | 3/1991 | Gale et al. | 162/157.5 |
| 5,006,394 | 4/1991 | Baird | 428/138 |
| 5,047,121 | 9/1991 | Kochar | 162/146 |
| 5,061,538 | 10/1991 | Hendrix et al. | 428/74 |
| 5,133,835 | 7/1992 | Goettmann | 162/146 |

*Primary Examiner*—James J. Seidleck

*Assistant Examiner*—Micheal A. Williamson

*Attorney, Agent, or Firm*—Ostrager, Chong & Flaherty

[57] ABSTRACT

An in-mold label material is a nonwoven mat of fibers having one side fused with the outer surface of a polymeric container and the other side coated with a pigment-containing latex suitable for printing thereon. The label paper is manufactured from commercially available fibers combined in water into a homogeneous mixture and then formed into a mat employing a wet-lay process. For use with polyethylene containers, the label may be a web consisting of 88–100% polyethylene fibers and 0–15% polyvinyl alcohol fibers or 70–100% polyethylene fibers, 0–15% polyvinyl alcohol fibers and 0–30% polypropylene fibers. For use with polyester containers, the label may be a web consisting of 50–90% polyester staple fibers, 10–40% bicomponent polyester/co-polyester, core/sheath binder fibers and 0–10% polyvinyl alcohol binder fibers thermally bonded together. The nonwoven web of fibers has a pigmented coating. After the material has been cut into labels, the labels may be applied to the blow-molded containers in-mold without the use of an adhesive material using a conventional in-mold labeling technique or post-mold using adhesive.

9 Claims, 3 Drawing Sheets

1000 X

200 X

50 X

C
D
D

1000 X

C

200 X

C

50 X

RECYCLABLE POLYMERIC LABEL PAPER

This is a continuation of application Ser. No. 07/823,525 filed on Jan. 21, 1992 now ABN., which is a continuation-in-part of Ser. No. 07/489,427 filed Mar. 5, 1990 now U.S. Pat. No. 5,133,835.

FIELD OF THE INVENTION

This invention generally relates to labels, especially to labels adapted for use in labeling of blow-molded plastic containers. In particular, the label comprises a coated 100% synthetic web prepared by a wet-lay process. The web is comprised of synthetic fibers and has a pigmented coating on one surface. The label may be applied either in-mold or post-mold to a blow-molded container made of the same synthetic material as the main synthetic fiber component (for example, polyethylene, polyester or polypropylene) of the label with or without the use of an adhesive material and may be recycled along with the container.

BACKGROUND OF THE INVENTION

The in-molding labeling of blow-molded plastic containers is less costly than conventional labeling methods in which labels with adhesive backing are adhered to the container in a separate step subsequent to blow molding. In-molding labeling eliminates this separate step, thereby reducing labor costs associated with handling of the adhesive-backed labels and capital costs associated with the equipment used to handle and apply adhesive-backed labels.

In accordance with conventional in-molding labeling of blow-molded plastic containers, labels are sequentially supplied from a magazine and positioned inside the mold by, for example, a vacuum-operated device. Plastic material is then extruded from a die to form a parison as depicted in FIG. 6 of U.S. Pat. No. 4,986,866 to Ohba et al., the description of which is specifically incorporated by reference herein. The mold is locked to seal the parison and then compressed air is fed from a nozzle to the inside of the parison to perform blow molding wherein the parison is expanded to conform to the inner surface of the mold. Simultaneously with the blow molding, the heat-sealable layer of the label of Ohba et al. is pressed by the outer side of the parison and fused thereto. Finally, the mold is cooled to solidify the molded container and opened to obtain a labeled hollow container.

For the sake of efficiency, it is desirable that the labeling of blow-molded containers be conducted continuously and rapidly. Also the labels to be applied during in-mold labeling should be sufficiently stiff that the automatic equipment used to handle the labels does not cause wrinkling or folding thereof. Conversely, the labels must be sufficiently elastic that they neither tear nor separate from the plastic container during flexing or squeezing of the latter.

A further disadvantage of conventional in-mold labels prepared from paper is that prior to recycling of the plastic container, the paper label must be removed using either solvent or mechanical means to avoid contamination of the recycled plastic material by small pieces of paper.

One prior art attempt to grapple with this recycling problem is disclosed in U.S. Pat. No. 4,837,075 to Dudley, which teaches a coextruded plastic film label for in-mold labeling of blow-molded polyethylene containers. The label comprises a heat-activatable activatable ethylene polymer adhesive layer and a surface printable layer comprising polystyrene. The heat activatable adhesive substrate layer comprises a polyethylene polymer. Pigment or fillers are incorporated in the polystyrene layer to provide a suitable background for printing. An example of a suitable pigment is titanium dioxide and an example of a suitable filler is calcium carbonate. Preferably a layer is interposed between the adhesive substrate and the surface printable layer that comprises reground and recycled thermoplastic material used to prepare such labels. The label stock is prepared by coextrusion of the various label layers utilizing conventional coextrusion techniques. Separately applied adhesive is not employed.

The aforementioned patent to Ohba et al. teaches a synthetic label for in-mold labeling of blow-molded resin containers comprising a thermoplastic resin film base layer and a heat-sealable resin layer having a melting point lower than that of the thermoplastic resin base layer. The base layer has an inorganic filler, such as titanium dioxide or calcium carbonate, incorporated therein or incorporated in a latex coating thereon. The base layer may, for example, be high-density polyethylene or polyethylene terephthalate. The heat-sealable resin layer may, for example, be low-density polyethylene. The heat-sealable resin layer serves to firmly adhere the label to a resin container. In accordance with the preferred embodiment of the Ohba et al. label material for use on a blow-molded container made of polyethylene, four separate layers are joined together by coextrusion.

U.S. Pat. No. 5,006,394 to Baird teaches a polymeric film structure having a high percentage of fillers, for example, opacifying or whitening agents such as titanium dioxide and calcium carbonate. The fillers are concentrated in a separate filler containing layer coextruded with a base layer. The base layer may comprise polyolefins (for example, polyethylenes), polyesters or nylons. The filler-containing layer may comprise any of the same polymeric materials, but preferably comprises ethylene vinyl acetate coploymer. However, this film material is intended for use in disposable consumer products such as diapers.

In addition, U.S. Pat. No. 4,941,947 to Guckert et al. discloses a thermally bonded composite sheet comprising a layer of flash-spun polyethylene plexifilamentary film-fibril strand sheet in face-to-face contact with a layer of polyethylene synthetic pulp suitable for use in bar code printing. The layer of polyethylene synthetic pulp is formed by conventional wet-lay papermaking techniques.

The Dudley and Ohba et al. patents both disclose an in-mold label having a multiplicity of layers coextruded together. This complexity of structure raises the costs of manufacturing the respective in-mold label materials. Although there is no suggestion in the Baird patent that the film material disclosed therein would be suitable for use as in-mold label paper, if it were usable for that purpose it would suffer from the same disadvantage of being a relatively complex laminated structure and therefore relatively costly to manufacture. Likewise the patent to Guckert et al. discloses a laminated structure.

SUMMARY OF THE INVENTION

An object of the present invention is to overcome the aforementioned shortcomings of prior art synthetic materials. In particular, it is an object of the present invention to provide a non-film polymeric label adapted to be used in-mold labeling of blow-molded containers made of polymeric material.

Another object of the invention is to provide a label for a blow-molded polymeric container which can be applied on the container efficiently and economically and without the need for adhesive material.

A further object of the invention is to provide a label for a blow-molded polymeric container which need not be removed prior to recycling of the polymeric container. A related object is to provide a label material for a polymeric container which does not leave behind any foreign material to be screened out when the labeled container is melted.

Also it is an object of the invention to provide a label for a blow-molded polymeric container which is sufficiently elastic to withstand flexing and squeezing of the plastic container without tearing or separating therefrom.

Further, for those applications where a small amount of adhesive would not be an impediment to recyclability of the container, it is an object of the invention to provide a polymeric label paper which can be applied using adhesive after the container has been blow-molded.

In the present invention, these objects, as well as other objects which will be apparent from the detailed description which follows, are achieved generally by providing a coated 100% synthetic web prepared by a wet-lay process.

In accordance with the invention, a label material comprises a nonwoven mat of fibers, one side of which is bonded to the outer surface of the polymeric container and the other side of which has a pigmented coating, e.g., a clay-type coating or a pigment-containing latex. However, any technique for coating substrates for printing known to the papermaking industry is applicable, including the use of pigmented coatings having synthetic binders, e.g., adhesives, or natural binders, e.g., starch, casein or soybean derivative. The label paper in accordance with the invention is manufactured from commercially available fibers. The components may be combined in water into a homogeneous mixture and then formed into a mat employing a wet-lay process.

In accordance with a first preferred embodiment, the web is comprised of 88–100% polyethylene fibers and 0–12% polyvinyl alcohol fibers. In a variation of this embodiment, the web comprises 70–100% polyethylene fibers, 0–15% polyvinyl alcohol fibers and 0–30% polypropylene fibers.

In accordance with another preferred embodiment, the web comprises 50–90% polyester staple fibers, 10–40% bicomponent polyester/co-polyester core/sheath binder fibers and 0–10% polyvinyl alcohol binder fibers thermally bonded together. Each bicomponent binder fiber comprises a core of polyester surrounded by a co-polyester sheath.

In both preferred embodiments, the nonwoven web of fibers is coated, for example, with an ethylene vinyl chloride copolymer Latex having a glass transition temperature ($T_g$) of 0°–30° C. The latex may be compounded to contain pigment such as calcium carbonate, titanium dioxide or both at pigment/binder ratios of 0.5/1 to 8/1, resulting in a surface coating suitable for printing thereon. However, the use of a latex coating, as opposed to other conventional coatings, is not required to practice the invention.

After the material has been cut into labels, the labels may be applied to the blow-molded containers in-mold without the use of an adhesive material using a conventional in-mold labeling technique or post-mold using adhesive. The label material in accordance with the first preferred embodiment is used with polyethylene containers; the label material in accordance with the second preferred embodiment is used with polyester containers. Due to the compatibility of the respective materials making up the container and label, the label may be recycled along with the container.

Other objects, features and advantages of the present invention will be apparent when the detailed description of the preferred embodiments of the invention are considered in conjunction with the drawings.

BRIEF DESCRIPTION OF THE DRAWINGS

The preferred embodiments of the invention will be described in detail below with reference to the drawings, wherein.

DETAIL DESCRIPTION OF THE PREFERRED EMBODIMENTS

Figure 1A:
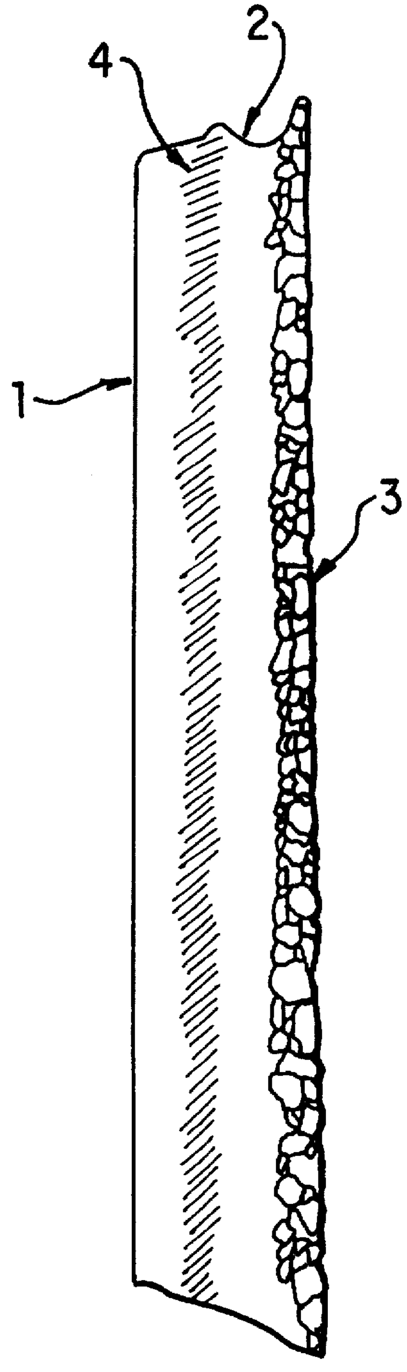
FIGS. 1A and 1B are cross-sectional views of a portion of the labeled container in accordance with the first and second preferred embodiments of the invention, respectively.

The structure of the adhesive-free labeled container in accordance with the first preferred embodiment of the invention is generally depicted in FIG. 1A. When the label is applied on the outer surface of the container in accordance with the invention, a laminated structure is formed comprising the container wall 1, a uniform fiber substrate 2 and a pigmented coating 3. The hatching 4 designates the fused interface between the container wall 1 and the fiber substrate 2.

Figure 1B:
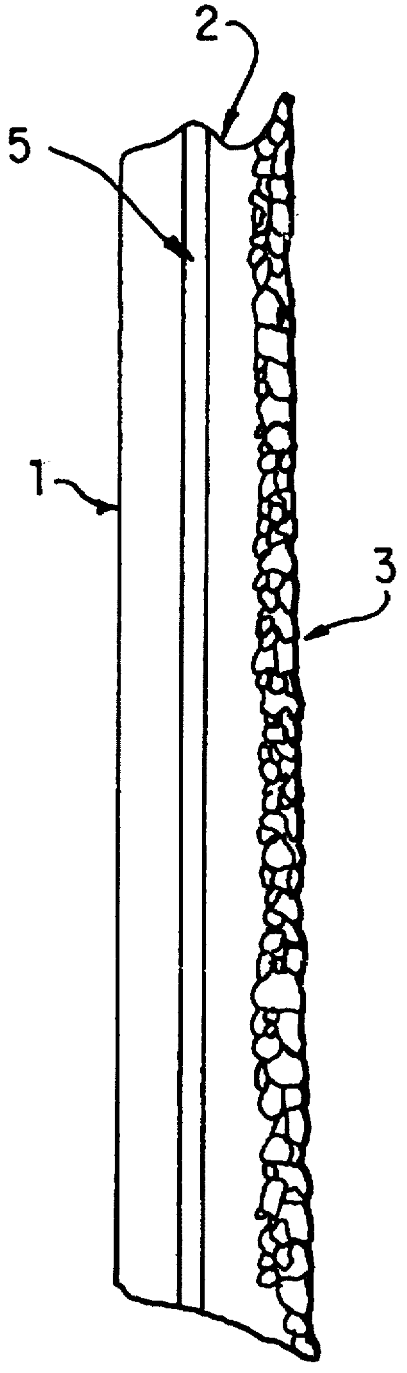

In accordance with the second preferred embodiment of the invention, the fused interface 4 is absent and instead the label is bonded to the outer surface of the container using adhesive. FIG. 1B shows a layer 5 of adhesive sandwiched between the container wall 1 and the fiber substrate 2. Any conventional adhesive can be used which is compatible with the base polymeric material for recycling purposes.

As described in detail below, in accordance with the invention the fiber substrate 2 is formed from a web of synthetic fibers, at least some of which fibers are made of the same polymeric material as that used to make the container. The container and compatible label paper may be made of polyethylene, polyester, polypropylene or any other polymeric material used in bottling.

In accordance with preferred embodiments of the invention for use with polyethylene containers, the web comprises 85–100% polyethylene fibers and 0–15% polyvinyl alcohol fibers and is coated with a clay-type coating typically used to make printing-grade paper. For example, the web may be coated with an ethylene vinyl chloride copolymer latex having a glass transition temperature ($T_g$) of 0°–30° C. and compounded to contain pigment such as calcium carbonate, titanium dioxide, clay, talc or other inorganic pigments as known to those skilled in the art. The coating may contain any conventional binder other than latex.

After the material has been cut into labels, the labels may be applied to polyethylene containers in-mold without the use of an adhesive material or post-mold using adhesive. Because the materials of the label and container are compatible, the label may be recycled along with the container.

The label paper for use on polyethylene containers is manufactured from commercially available fibers such as polyethylene pulp, chopped polyethylene staple fibers and polyvinyl alcohol binder fibers. The components may be combined in water into a homogeneous mixture and then formed into a mat employing a wet-lay process.

In accordance with a first example of the label paper for use on polyethylene containers, the starting fiber materials consist of 90 wt. % Mitsui 9400 Fybrel™ polyethylene pulp commercially available in the United States from Minifibers, Route 14, Box 11, Johnson City, Tenn. 37615 and 10 wt. % Kuraray 105-2 polyvinyl alcohol (PVA) binder fibers commercially available in the United States from C. Itoh & Co. (America), Inc., 335 Madison Avenue, New York, N.Y. 10017. In Mitsui 9400 Fybrel™ polyethylene pulp the polyethylene fibers have an average length of 0.90 mm and a diameter of 15 microns. Kuraray 105-2 PVA binder fibers have an average length of 5 mm and a denier of 2.0.

In accordance with a second example of the label paper for use on polyethylene containers, the starting fiber material may be 100 wt. % Mitsui 9400 Fybrel™ polyethylene pulp, that is, PVA binder fibers are not essential to practice of the invention.

Alternatively, in accordance with a variation of the label paper for use on polyethylene containers, some of the Kuraray 105-2 PVA binder fibers are replaced by 10 mm×2.2 denier Hercules Herculon™ polypropylene staple fibers. These polypropylene staple fibers are commercially available in the United States from Hercules, Inc., 3169 Holcomb Bridge Road, Suite 301, Norcross, Ga. 30071. In accordance with this variation the web is comprised of 70–100% polyethylene fibers, 0–15% fibers and 0–30% polypropylene fibers. One example of this variation successfully made by the inventors had 85% polyethylene fibers, 7.5% PVA fibers and 7.5% polypropylene fibers.

After the base mat has been dried, it is treated with a coating comprised of a binder, e.g., latex, pigmented with calcium carbonate, titanium dioxide, clay, talc or other inorganic pigment. The surface treatment may be applied with any commercially available coater, treater or size press. Thereafter the web can be supercalendared to give the coating a predetermined surface smoothness.

In accordance with the preferred embodiment of the coating applied to the above-described webs for use with polyethylene containers, the starting coating materials are 50 wt. % Airflex 4514 ethylene vinyl chloride latex and 50 wt. % Albagloss calcium carbonate. The Airflex 4514 latex is commercially available in the United States from Air Products and Chemicals, Polymers and Chemicals Division, 5100 Tilghman Street, Allentown, Pa. 18104. The Albagloss calcium carbonate is commercially available in the United States from Pfizer, Inc., Minerals, Pigments and Metals Division, 640 North 13th Street, Easton, Pa. 18042-1497. The range of calcium carbonate incorporated in the coating can be varied from a pigment/binder ratio of 0.5/1 to 8/1, although the preferred ratio is 1/1.

The web material for use with polyethylene containers can be made on standard papermaking equipment. The process for making label paper prepared from a web of 90 wt. % polyethylene fibers and 10 wt. % PVA binder fibers is described hereinafter.

The Fybrel™ 9400 polyethylene pulp is loaded in a commercial papermaking pulper at consistencies between 2% and 5% solids. The material is pulped until it is completely dispersed in water and no fiber bundles are apparent. This mixture is then pumped to a mix chest where a predetermined amount of Kuraray 105-2 PVA binder fibers is added to the furnish so that the binder fibers make up 10 wt. % of the furnish solids. The mixture is agitated to achieve a uniform dispersion of the polyethylene pulp and the binder fibers.

The furnish is then formed on standard wet-lay papermaking equipment at headbox consistencies between 0.8% and 0.01%. The formed web may be wet-pressed and then dried in the first dryer section. When drying the web, care must be taken to ensure that the web and dryer can temperatures remain below the melting point of the polyethylene fibers, that is, below 132° C. (269° F.).

Thereafter the dried web is treated with ethylene vinyl chloride latex solution containing calcium carbonate pigment. This treatment may be performed on a paper machine size press or any type of off-line coater or treater. The coating is applied to the web in an amount that achieves a 10 wt. % add-on of dried coating solids, that is, 200 lbs/ton, although it will be recognized by the person skilled in the art that the weight percentage of dried coating solids can be varied over a wide range. After the coating is dried, the coated web is supercalendared to attain a surface smoothness (Sheffield) of 125–250 units.

Figure 4:
FIGS. 2–4 are photomicrographs, respectively at 50×, 200× and 1000× magnification, of a first example of a synthetic label paper in accordance with the invention.
Figure 3:
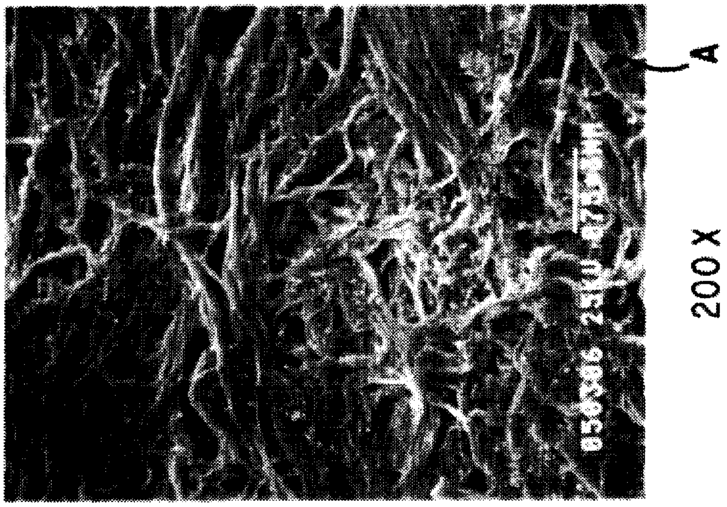
Figure 2:
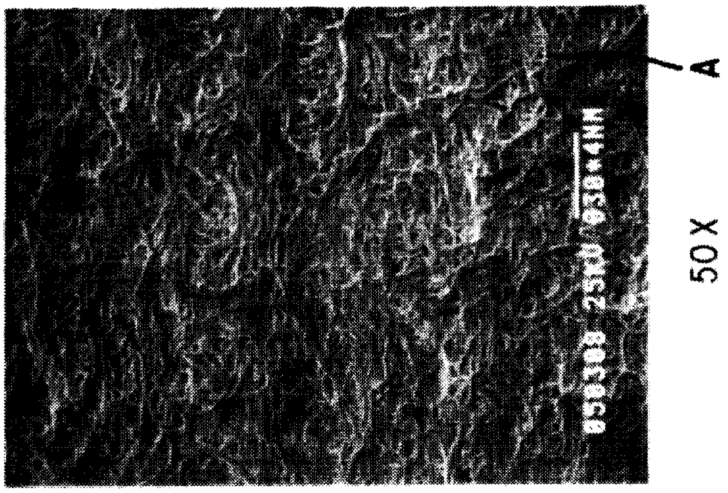

The microstructure of the label paper for use with polyethylene containers is shown in FIGS. 2 through 4 at magnifications of 50×, 200× and 1000× respectively. The entangled Fybrel™ 9400 polyethylene pulp fibers are indicated by the letter A in FIGS. 2 through 4; the Albagloss calcium carbonate particles attached to the polyethylene fibers are indicated by the letter B in FIG. 4. The Kuraray 105-2 PVA binder fibers and the latex particles are not visible in the photomicrographs.

The physical properties of the label paper for use with polyethylene containers are listed in Table I.

In accordance with the preferred embodiments of the invention intended for use with polyester containers, the web comprises polyester staple fibers, bicomponent polyester/co-polyester, core/sheath binder fibers and PVA binder fibers. Each bicomponent binder fiber comprises a core of polyester surrounded by a co-polyester sheath. After the wet-laid sheet has been dried, the dried base sheet is thermal-bonded at a predetermined temperature and a predetermined pressure to bond the fibers on both surfaces of the sheet and impart strength. The sheet is then coated with an ethylene vinyl chloride latex having a glass transition temperature ($T_g$) of 0°–30° C. Again the latex may be compounded to contain pigment such as calcium carbonate, titanium dioxide, clay, talc or other inorganic pigments at pigment/binder ratios of 0.5/1 to 8/1. After the material has been cut into labels, the labels may be applied to polyester containers in-mold without the use of an adhesive material or post-mold using adhesive. Because the materials of the label and container

TABLE I

Physical Property Test Data

| TAPPI No. | Physical Property | Uncoated Base Sheet | Finished Coated Sheet |
|---|---|---|---|
| 410 | Basis Weight | | |
| | (3000 ft²) | 45.0 | 50.0 |
| | (oz./yd²) | 2.2 | 2.4 |
| 411 | Caliper (mils) | 8.8 | 8.0 |
| 251 | Porosity-Permeability Frazier Air (cfm) | <0 | <0 |
| 460 | Gurley Porosity (sec/100 cc) | 10 | 22 |
| 538 | Sheffield Smoothness (T/W) | — | 200/260 |
| 403 | Mullen Burst (psi) | — | 5 |
| 414 | Elmendorf Tear (g) (MD/CD) | — | 25/31 |
| 511 | MIT Fold (MD/CD) | — | 2/0 |
| 494 | Tensile (lbs/in.) (MD/CD) | 4.1/2.4 | 5.6/2.8 |
| 494 | Elongation (%) (MD/CD) | — | 4.3/6.5 |
| 494 | TEA (ft-lb/ft²) (MD/CD) | — | 2.1/1.6 |
| 452 | GE Brightness (%) | 93.3 | 93.9 |
| 425 | Opacity (%) | 97.1 | 96.6 |
| 413 | Ash (%) (500° C.) | 0.0 | 3.0 |

are compatible, the label may be recycled along with the container. The label paper for use with polyester containers is manufactured from commercially available fibers such as chopped polyester staple fibers, polyester/co-polyester, core/sheath binder fibers and PVA binder fibers. Again the components may be combined in water into a homogeneous mixture and then formed into a mat employing a wet-lay process.

In accordance with a first example of the label paper for use with polyester containers, the starting fiber materials are 77 wt. % Kuraray polyester chopped strand, 19 wt. % Kuraray N-720 polyester/co-polyester, core/sheath binder fibers and 4 wt. % Kuraray 105-2 PVA binder fibers. All of these fibers are commercially available in the United States from C. Itoh & Co. (America), Inc., 335 Madison Avenue, New York, N.Y. 10017. The Kuraray chopped polyester staple fibers have an average length of 5 mm and a denier of 0.4. Kuraray N-720 polyester/co-polyester, core/sheath binder fibers have an average length of 10 mm and a denier of 2.0. Kuraray 105-2 PVA binder fibers have an average length of 5 mm and a denier of 2.0.

In accordance with a second example of the label paper for use with polyester containers, the starting fiber materials are 80 wt. % Kuraray polyester chopped strand and 20 wt. % Kuraray N-720 polyester/co-polyester, core/sheath binder fibers. No Kuraray 105-2 PVA binder fibers are used.

In accordance with variations of the first and second examples of the label paper for use with polyester containers, an equal weight percent of Teijin polyester staple fibers having an average length of 5 mm and a denier of 0.5 can be substituted for the Kuraray chopped polyester staple fibers. In accordance with other variations, an equal weight percent of Hoechst-Celanese 104 binder fibers can be substituted for the Kuraray N-720 binder fibers.

However, the fiber composition of the label paper for use with polyester containers is not limited to the specific weight percentages of the examples described above. The amount of PVA binder fibers may be varied from 0 to 10 wt. %; the amount of co-polyester/polyester, sheath/core binder fibers may be varied from 10 to 40 wt. %; and the amount of polyester staple fibers may be varied from 50 to 90 wt. %. Furthermore, the average length and the denier of the chopped polyester staple fibers may be varied from 5 to 12 mm and from 0.4 to 1.5 denier respectively; and the average length and the denier of the co-polyester/polyester, sheath/core binder fibers may be varied from 5 to 12 mm and from 2.0 to 6.0 denier respectively.

After the base mat has been dried, the base sheet is thermal-bonded between steel calendar rolls heated to a temperature of 196° C. The base mat is then treated with a coating comprised of a latex pigmented with calcium carbonate, titanium dioxide or both. The surface treatment may be applied with any commercially available coater, treater or size press.

In accordance with the second preferred embodiment, the starting coating materials are 50 wt. % Airflex 4514 ethylene vinyl chloride copolymer latex and 50 wt. % Albagloss calcium carbonate. The range of calcium carbonate incorporated in the coating can be varied from a pigment/binder ratio of 0.5/1 to 8/1, although the preferred ratio is 1/1. The glass transition temperature $T_g$ of the ethylene vinyl chloride latex may vary from 0° C. to 30° C.

The web material in accordance with the second preferred embodiment can be made on standard papermaking or nonwoven fabric equipment. The polyester cut staple fibers, the polyester/co-polyester, core/sheath binder fibers and the polyvinyl alcohol binder fibers are added to water undergoing agitation and containing a predissolved surfactant material, such as Milease T, at a level of 0.5% based on polyester fiber weight. Milease T is commercially available from I.C.I. Americas, Inc.

The foregoing fiber components should be added to the blend chest in the following sequence:

1. Polyvinyl alcohol binder fibers
2. Polyester/co-polyester, core/sheath binder fibers
3. Polyester cut staple fibers The consistency of the mixture in the blend chest should be between 0.5 and 2.5%. An anionic polyacrylamide such as 87PW061 may be added at levels in the range 0.5–8.0 lbs/ton based on fiber weight to aid in fiber dispersion. 87PW061 is commercially available from Nalco Chemical. The mixture is then agitated to attain a uniform dispersion of all materials.

The resulting furnish is then formed on standard wet-lay papermaking equipment at headbox consistencies of 0.7–0.01%. The wet-laid material is then dried in the dryer section.

The dried web is calendared between smooth metal rolls heated to a temperature of 196° C. The web is calendared at minimal pressure, that is, 50–150 PLI, to achieve bonding of the surface fibers while maintaining the degree of opacity of the original sheet.

This material is then ready to be treated with the ethylene vinyl chloride latex solution pigmented with calcium carbonate. The treatment may be applied on a paper machine size press or any type of off-line coater or saturator. The coating is applied in a manner that results in a 10 wt. % add-on of dried coating solids, that is, 200 lbs/ton. The coating is then dried. After the coating is dried, the coated web is supercalendared to attain a surface smoothness (Sheffield) of 125–250 units.

Figure 7:
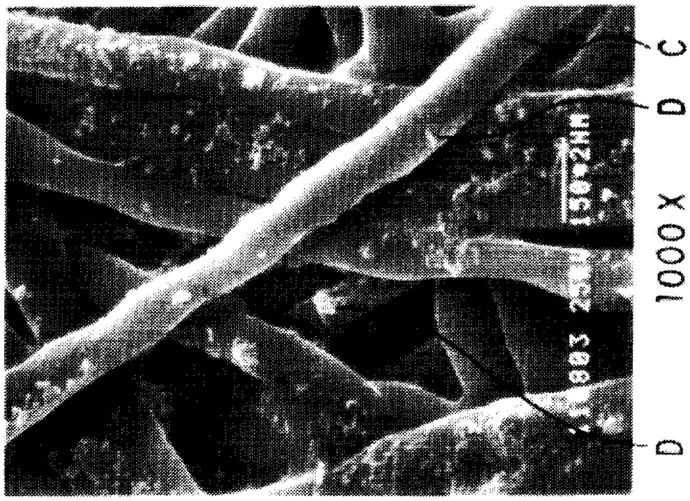
FIGS. 5–7 are photomicrographs, respectively at 50×, 200× and 1000× magnification, of a second example of the synthetic label paper in accordance with the invention.
Figure 6:
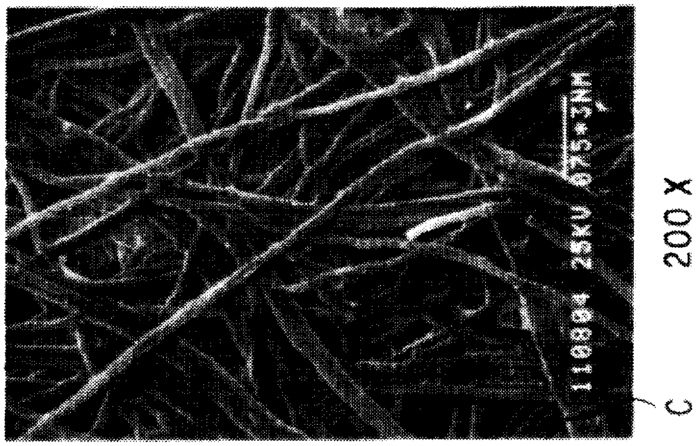
Figure 5:
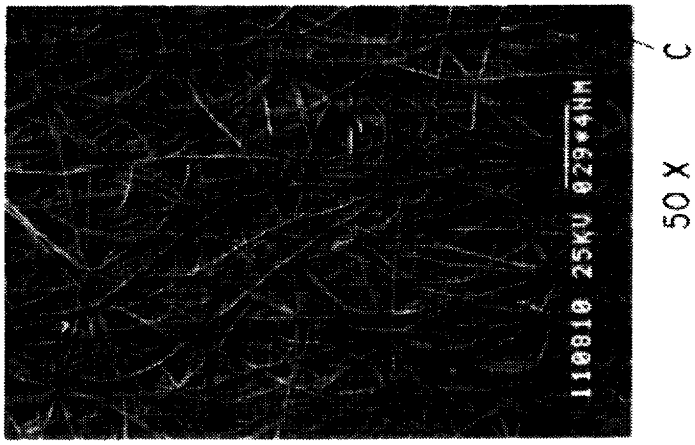

The microstructure of the label paper in accordance with the first example of the second preferred embodiment of the invention without pigment is shown in FIGS. 5 through 7 at magnifications of 50×, 200× and 1000× respectively. The entangled Kuraray 5 mm×0.4 denier polyester staple fibers are indicated by the letter C in FIGS. 5–7; the Albagloss calcium carbonate particles attached to the polyester fibers are indicated by the letter D in FIG. 7. The Kuraray co-polyester/polyester, sheath/core binder fibers, the Kuraray 105-2 polyvinyl alcohol binder fibers and the latex particles are not visible in the photomicrographs of FIGS. 7–9.

The physical properties of the label paper in accordance with the first example of the second preferred embodiment of the invention are listed in Table II.

Although the invention has been described with reference to certain preferred embodiments, it will be appreciated that it would be obvious to one of ordinary skill in the art of fiber technology and papermaking that other fibers could be used to achieve the same beneficial results. For example, fibers may be selected for their ability to be fused to the surface of blow-molded containers made of polymeric material different than polyethylene and polyester, for example, a label made with

TABLE II

| TAPPI No. | Physical Property | Uncoated Base Sheet | Thermally Bonded Sheet | Finished Coated Sheet |
|---|---|---|---|---|
| | | Physical Property Test Data | | |
| 410 | Basis Weight (3000 $ft^2$) | 45.0 | 45.0 | 51.3 |
| 411 | Caliper (mils) | 15.6 | 4.8 | 7.9 |
| 251 | Porosity-Permeability Frazier Air (cfm) | 192 | 13 | 38 |
| 451 | Taber V-5 Stiffness (gcm) (MD/CD) | 1.9/1.4 | 1.1/0.9 | 4.2/2.5 |
| 403 | Mullen Burst (psi) | 13 | 126 | 183 |
| 414 | Elmendorf Tear (g) (MD/CD) | 233/261 | 229/168 | 184/138 |
| 511 | MIT Fold (MD/CD) | 3/6 | 2500+/2500+ | 2500+/2500+ |
| 494 | Tensile (lbs/in.) (MD/CD) | 4.7/4.6 | 25.0/25.0 | 33.2/43.2 |
| 494 | Elongation (%) (MD/CD) | 1.4/2.2 | 11.2/10.7 | 12.3/15.8 |
| 494 | TEA (ft-lb/$ft^2$) (MD/CD) | 0.7/1.3 | 32.9/32.1 | 40.4/72.9 |
| 452 | GE Brightness(%) | 82.5 | 86.9 | 85.6 |
| 425 | Opacity (%) | 69.0 | 74.2 | 76.5 |

polypropylene fibers for use with a polypropylene container. Also it would be obvious to one of ordinary skill that the preferred embodiments could be readily modified to meet specific conditions not disclosed here. All such variations and modifications are intended to be within the scope and spirit of the invention as defined in the claims appended hereto.

We claim:

1. In a labeled plastic container comprising a blow-molded container made of polyethylene and having an outer surface and a non-film polymeric label attached to said outer surface of said blow-molded container, the improvement wherein said label consists of a nonwoven web of wet-laid fibers bonded to said outer surface of said blow-molded container, said fibers comprising polyethylene pulp and none of said fibers being made of cellulosic material, said web having a continuous coating of pigmented binder formed on at least one surface thereof which provides a printable surface, said polyethylene pulp being bonded by said pigmented binder without substantial thermal fusion of said polyethylene pulp by curing said binder at temperatures below the melting temperature of said polyethylene.

2. The labeled plastic container as defined in claim 1, wherein the fiber composition of said nonwoven web is 85–100% polyethylene pulp and 0–15% polyvinyl alcohol binder fibers.

3. The labeled plastic container as defined in claim 1, wherein said binder comprises ethylene vinyl chloride.

4. The labeled plastic container as defined in claim 3, wherein the ratio of pigment to binder lies in the range from 0.5/1 to 8/1.

5. The labeled plastic container as defined in claim 1, wherein the fiber composition of said nonwoven web is 70–100% polyethylene pulp, 0–12% polyvinyl alcohol binder fibers and 0–30% polypropylene staple fibers.

6. A nonwoven composite web for use in making a cellulose-free, non-film polymeric labeled plastic container, consisting of a nonwoven web of 100% fibers entangled by a wet-lay process, said container being made of polyester and said web having the following fiber composition:

50–90% chopped polyester staple fibers;

10–40 wt. % binder fibers containing a co-polyester material having a melting temperature less than the melting temperature of said chopped polyester staple fibers; and 0–10% polyvinyl alcohol binder fibers.

7. The nonwoven composite web as defined in claim 6, wherein said binder fibers comprise bicomponent fibers having a sheath made of co-polyester and a core made of polyester, said polyester co-polyester sheath having a melting temperature which is less than the melting temperature of said chopped polyester staple fibers.

8. The nonwoven composite web as defined in claim 6, wherein said web is thermal calendared at a pressure of 50–150 PLI to fuse said chopped polyester staple fibers at the surfaces of said web.

9. The nonwoven composite web as defined in claim 8, wherein said thermal calendared web is saturated on at least one side thereof with a continuous coating of pigmented binder.

* * * * *

UNITED STATES PATENT AND TRADEMARK OFFICE

CERTIFICATE OF CORRECTION

PATENT NO. : 5,616,384

DATED : April 1, 1997

INVENTOR(S) : James A. Goettmann

It is certified that error appears in the above-indentified patent and that said Letters Patent is hereby corrected as shown below:

Column 1, line 64, after "heat-activatable" delete "activatable;

Column 3, line 47, change "Latex" to --latex--,

Column 4, line 16, change "DETAIL" to --DETAILED--;

Column 5, line 23, after "0-15%" insert --PVA--;

Claim 7, column 10, line 40, after "said"delete "polyester".

Signed and Sealed this

Twelfth Day of August, 1997

Attest:

BRUCE LEHMAN

*Attesting Officer*

*Commissioner of Patents and Trademarks*